US008201175B2

(12) United States Patent
Zhu

(10) Patent No.: US 8,201,175 B2
(45) Date of Patent: Jun. 12, 2012

(54) CREATING AND ASSOCIATING A VIRTUAL PSEUDO TTY WITH A RUNNING PROCESS

(75) Inventor: Feiqi Zhu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 974 days.

(21) Appl. No.: 12/186,107

(22) Filed: Aug. 5, 2008

(65) Prior Publication Data

US 2010/0037220 A1 Feb. 11, 2010

(51) Int. Cl.
*G06F 9/455* (2006.01)
*G06F 9/46* (2006.01)

(52) U.S. Cl. ....................................................... 718/102
(58) Field of Classification Search ........................ None
See application file for complete search history.

(56) References Cited

U.S. PATENT DOCUMENTS

| 5,483,647 | A | 1/1996 | Yu |
| 5,913,024 | A | 6/1999 | Green |
| 5,983,012 | A | 11/1999 | Bianchi |
| 6,944,860 | B2 | 9/2005 | Schmidt |
| 7,870,153 | B2 * | 1/2011 | Croft et al. .................... 707/781 |
| 2007/0174429 | A1 * | 7/2007 | Mazzaferri et al. ........... 709/218 |

OTHER PUBLICATIONS

N. Zeldovich et. al., "Making Information Flow Explicit in HiStar", 7th USENIX Symposium on Operating Systems Design and Implementation, 2006, pp. 263-278.
Morgan, David, "Workings of a Virtual Private Network in Linux", ACM, 1998, 8 pages.

* cited by examiner

*Primary Examiner* — Corey S Faherty
(74) *Attorney, Agent, or Firm* — Stephen J. Walder, Jr.; Diana R. Gerhardt

(57) ABSTRACT

Creating and associating a virtual pseudo tty device with a running process. A pool of virtual pseudo tty devices composed of a number of special character-oriented device files is created and associated with a sub-directory in the device file system. In response to receiving a process id (PID) of a running process, an unassociated virtual pseudo tty device in the pool of virtual pseudo tty devices is assigned to the running process. The association of the running process and the virtual pseudo tty device is accomplished by locating and modifying the running process's controlling tty in the running process's u-block to point to the assigned unassociated virtual pseudo tty device. Following which, the running process id and the associated virtual pseudo tty device are saved in a virtual pseudo tty mapping table thus allowing the running process to be disassociated from a physical console or pseudo tty device.

20 Claims, 4 Drawing Sheets

CREATING AND ASSOCIATING A VIRTUAL PSEUDO TTY WITH A RUNNING PROCESS

FIELD OF THE INVENTION

The present invention is generally related to data processing systems and, more particularly, is related to a system and method for creating and associating a virtual pseudo terminal (tty) with a running process.

BACKGROUND OF THE INVENTION

Computer systems are information processing systems which can be designed to give independent computing power to one user or a plurality of users. Computer systems may be found in many forms including, for example, mainframes, minicomputers, workstations, servers, personal, computers, and embedded systems. A computer system processes information according to a program and produces resultant output information via input/output (I/O) devices. A program is a list of internally stored instructions such as a particular application program and/or an operating system.

A process is the execution of a program and consists of patterns of bytes that the CPU interprets as machine instructions (called "text"), data and stack. Many processes appear to execute simultaneously as the kernel schedules them for execution and several processes may be instances of one program. A process executes by following a strict sequence of instructions that is self-contained and does not jump to that of another process; it reads and writes its data and stack sections, but it cannot read or write the data and stack of other processes. Processes communicate with other processes and with the rest of the world via system calls.

A process on a UNIX system is the entity that is created by a fork system call. Every process except process 0 is created when another process executes the fork system call. The process that invokes the fork system call is called the parent process and the newly created process is the child process. Every process has one parent process, but a process may have many child processes. The operating system kernel identifies each process by its process number, called the process id (PID). Process 0 is a special process that is created "by hand" when the system boots; after forking a child process (process 1), process 0 becomes the swapper process. Process 1, also known as init, is the ancestor of every other process in the system and enjoys a special relationship with them.

Under UNIX, or other UNIX like environments, such as AIX, when a user logs into a system and executes a process, the initiated process and all of its child processes, if any, are associated with a particular console. The console may be a physical console, for example, a physical terminal (tty) device, or a virtual console if the system is a Logical Partitioning (LPAR) system, or a pseudo tty, for example, pts/1, if the user remotely logs into the system, for example, via telnet, rlogin, ssh, etc. In the event that the user places the process in the background and proceeds to exit the console or pseudo tty from which the process was originally initiated, the process and all its child processes will continue to execute but will not be associated with any particular console or pseudo tty. For example, under the AIX operating system environment, if a process is not associated with any particular console or pseudo tty, executing the "ps ef" command to list all running processes will result in the TTY entry being shown as "-" for the process.

In many situations and, in particular, when performing system software tests, the running processes are required to be associated with a console or pseudo tty at all times during the test period. For example, the process of testing the "ps-t" command requires a console or pseudo tty to be presenting at all time during the testing session. Additionally, a user may want to initiate the processes in the background from a remotely login terminal and then proceeds to exit the remote terminal so that the processes will not be interrupted by any action executed at that particular remote terminal. Thus, what is needed in the art is for the running process to be able to be disassociated from the physical console or pseudo tty device that originally initiated the running process while still maintaining an association with a tty device.

SUMMARY OF THE INVENTION

To address the above-discussed deficiencies in the prior art, the present invention provides a method and system for creating and associating a virtual pseudo tty (vpt) device with a running process. The present invention discloses a novel method that creates a pool of virtual pseudo tty devices of special character-oriented device files associated with a subdirectory in the device file system. In response to receiving a process id of a running process, an unassociated virtual pseudo tty device in the pool of virtual pseudo tty devices is assigned to the running process. In another embodiment, in response to receiving a process id of a running process and a specified virtual pseudo tty device, the specified virtual pseudo tty device is assigned to the running process. The association is accomplished by locating and modifying the running process's controlling tty in the running process's assigned memory location (u-block) to point to the assigned unassociated or specified virtual pseudo tty device. Following which, the running process id and the associated virtual pseudo tty device are saved in a virtual pseudo tty mapping table thus allowing the running process to be disassociated from a physical console or pseudo tty device.

The virtual pseudo tty device disclosed by the present invention is a virtualized device, unlike virtual network computing (VNC), "screen", "window", or any other types of conventional tty or terminals, such as a telnet terminal, which are visible entities that users may log into. The present invention's virtual pseudo tty device may be utilized to be associated with a running process or to a ready-to-running process. The association may be accomplished when the process is initiated or, alternatively, after the process has already been executed. In advantageous embodiments, the conventional techniques listed above may be utilized to facilitate the process associations by providing the input means for initiating/executing the creation and association of a virtual pseudo tty device with a process disclosed by the present invention.

Furthermore, unlike the conventional techniques listed above, the virtual pseudo tty device may be associated or disassociated with any running process at any time regardless of where the process was originally initiated from. In the case of when screen, window, VNC or other terminal types are "disconnected", the processes associated with these tty types will either "die" (if they are running in the foreground) or be disassociated with them and also be unable to be re-associated with the tty device again. Due to the present invention's inherent characteristic of being able to associate/disassociate at any time, the virtual pseudo tty device may also be utilized to classify the processes, i.e., utilizing the virtual pseudo tty device as a criteria to place the processes into categories according to a user preferences. This is useful in situations such as dealing with batch jobs, performance monitoring or process monitoring. Additionally, a virtual pseudo tty device may be employed in testing operation system commands to simulate the actual console or tty device.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE PREFERRED EMBODIMENT

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
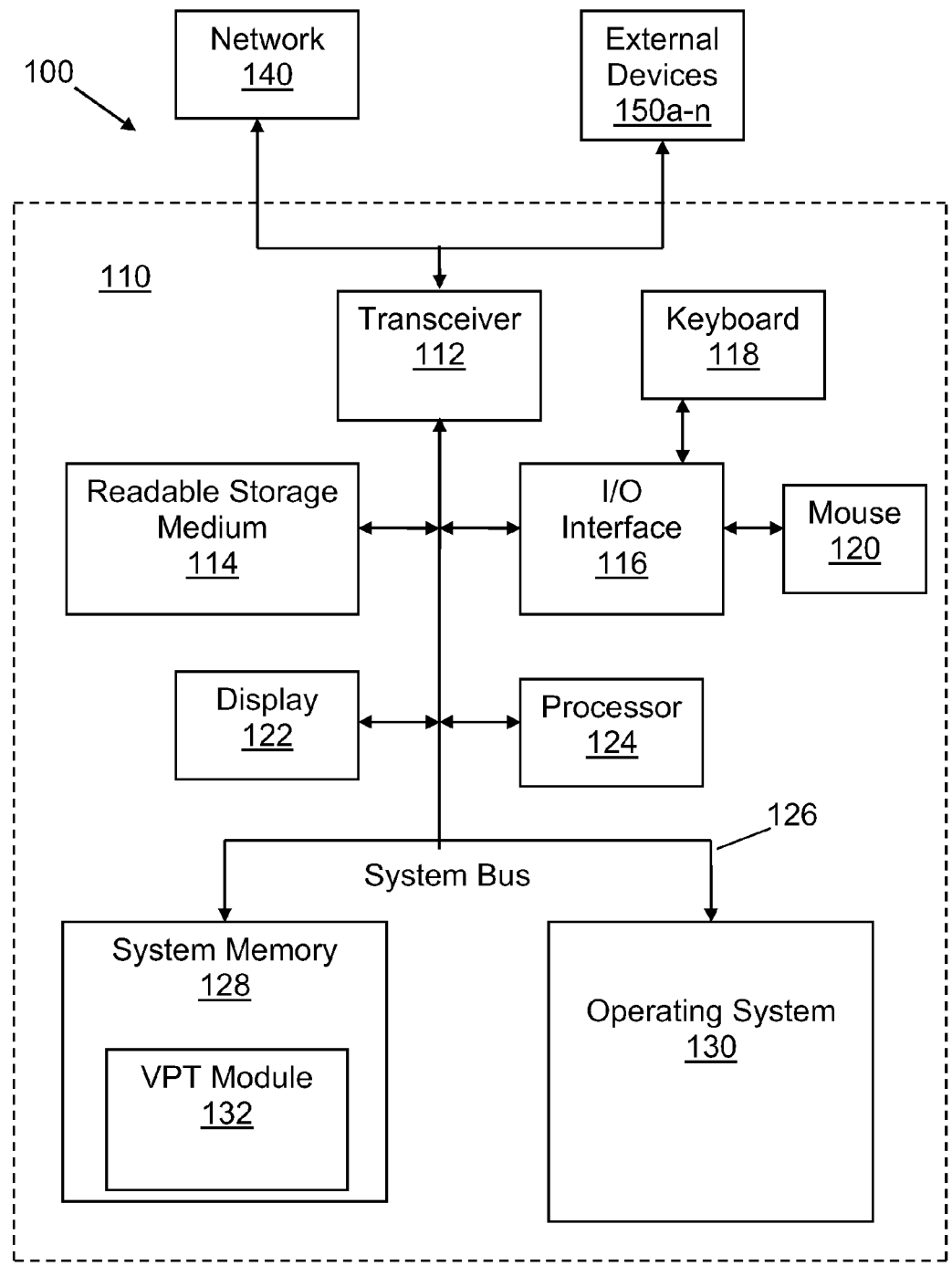
FIG. 1 illustrates a block diagram of a representative data processing system that provides a suitable environment in which the present invention may be implemented.

Referring initially to FIG. 1, there is depicted a block diagram of a representative data processing system 100 that provides a suitable environment in which the present invention may be implemented. Data processing system 100 includes a computer 110, which in turn, includes a processor 124 that is coupled to a system bus 126. A transceiver 112, connected to the system bus 126, enables the computer 110 to connect to a network 140 and to a plurality of external devices 150a-n via wired or wireless mechanisms. A display 122, coupled to the system bus 126, allows for presentation of a general user interface (including text and graphics) for use by a user of the computer 110. The system bus 126 also affords communication with a hardware-based readable storage medium 114 (e.g., Compact Disk-Read Only Memory (CD-ROM), flash drive memory, etc). An Input/Output (I/O) Interface 116, also connected to the system bus 126, permits user interaction with the computer 110, such as data entry via a keyboard 118 or a mouse 120.

As shown, the computer 110 also comprises a system memory 128. The system memory 128 also comprises a virtual pseudo tty (vpt) logic module 132 for autonomously executing the disclosed methodology of creating a virtual pseudo tty for association with a running process based on the principles disclosed by the present invention. The virtual pseudo tty logic module 132 comprises a create a pool of vpt devices module and an assign vpt module. In an advantageous embodiment, the virtual pseudo tty logic module 132 includes code for implementing the processes described hereinbelow in conjunction with FIGS. 2-4. The computer 110 also comprises an operating-system 130, such as UNIX, coupled to the system bus 126.

As illustrated and described herein, the computer 110 may be a computer system or server having the required hardware components and programmed with the virtual pseudo tty logic module 132 executing on the processor to provide the functionality of the disclosed invention. However, in other advantageous embodiments, the computer 110 may also be a device that is specifically designed to include the functionality of the virtual pseudo tty logic module 132, as described herein. The hardware elements depicted in the computer 110 are not intended to be exhaustive, but rather are representative to highlight components required by and/or utilized to implement the present invention. For instance, the computer 110 may include alternate memory storage devices such as magnetic cassettes, Digital Versatile Disks (DVDs), Bernoulli cartridges, and the like. These alternate configurations of components and other variations are intended to be within the spirit and scope of the present invention.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical (or recordable type) computer-readable media including RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Additionally, when information is transferred or provided over a network or another communications connection (either hardwired, wireless, or a combination of hardwired or wireless) to a computer, the computer properly views the connection as a computer-readable medium. Thus, any such connection is also properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the present invention has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Figure 2:
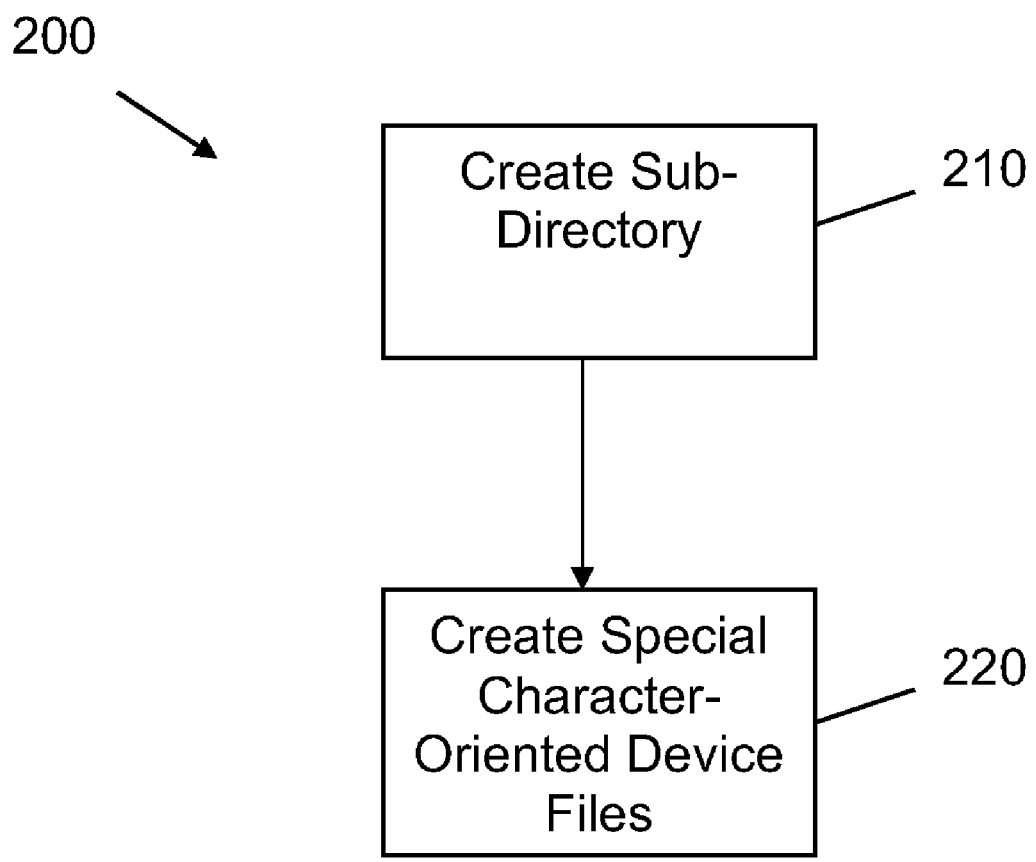
FIG. 2 illustrates an: exemplary process flow diagram of a create pool of virtual pseudo tty (vpt) devices module for creating a sub-directory and special character-oriented devices according to the principles disclosed by the present invention.
Figure 3:
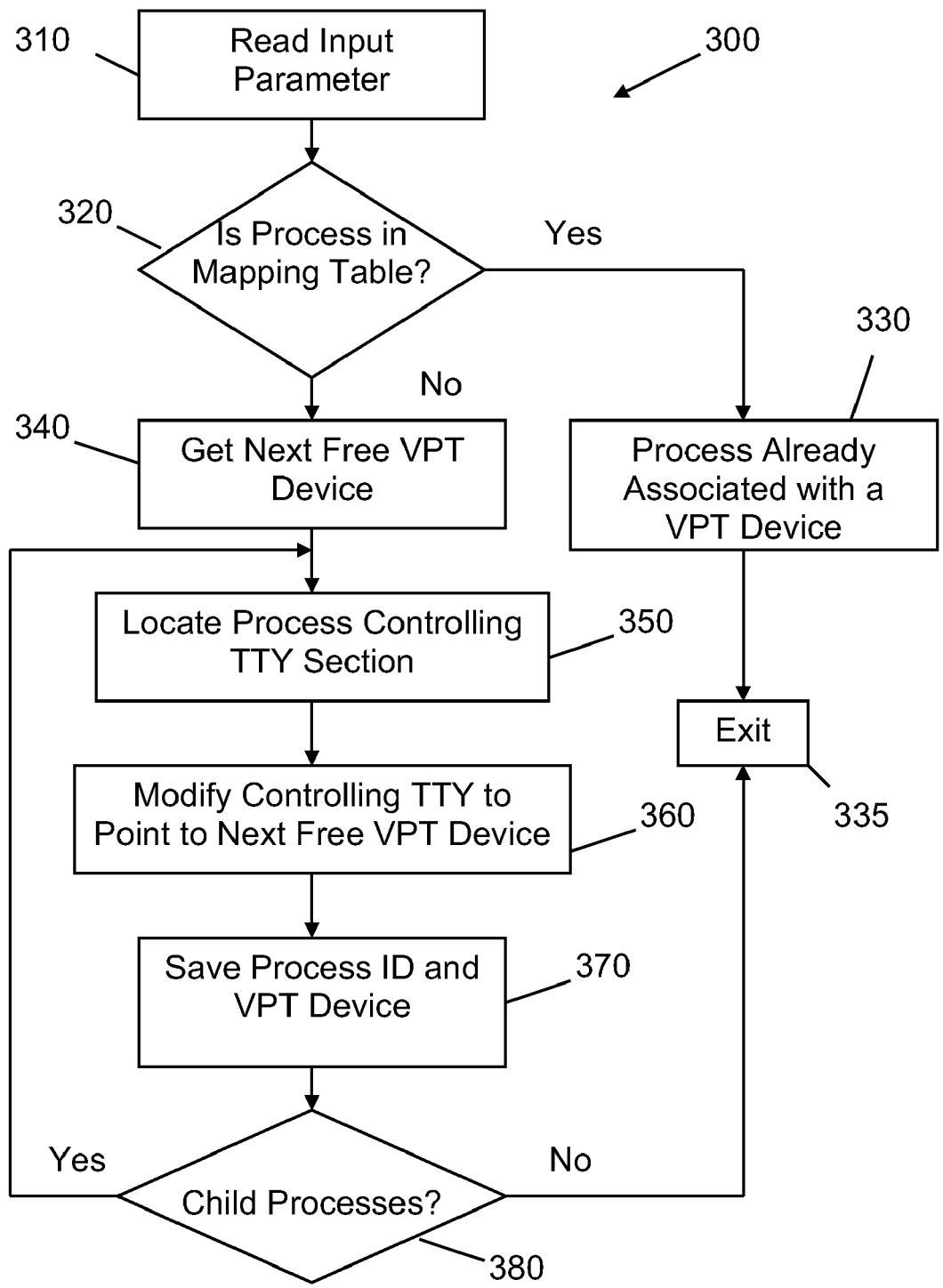
FIG. 3 illustrates a process flow of one representative embodiment of an assign vpt module for associating a process with a virtual pseudo tty device according to the principles of the present invention.
Figure 4:
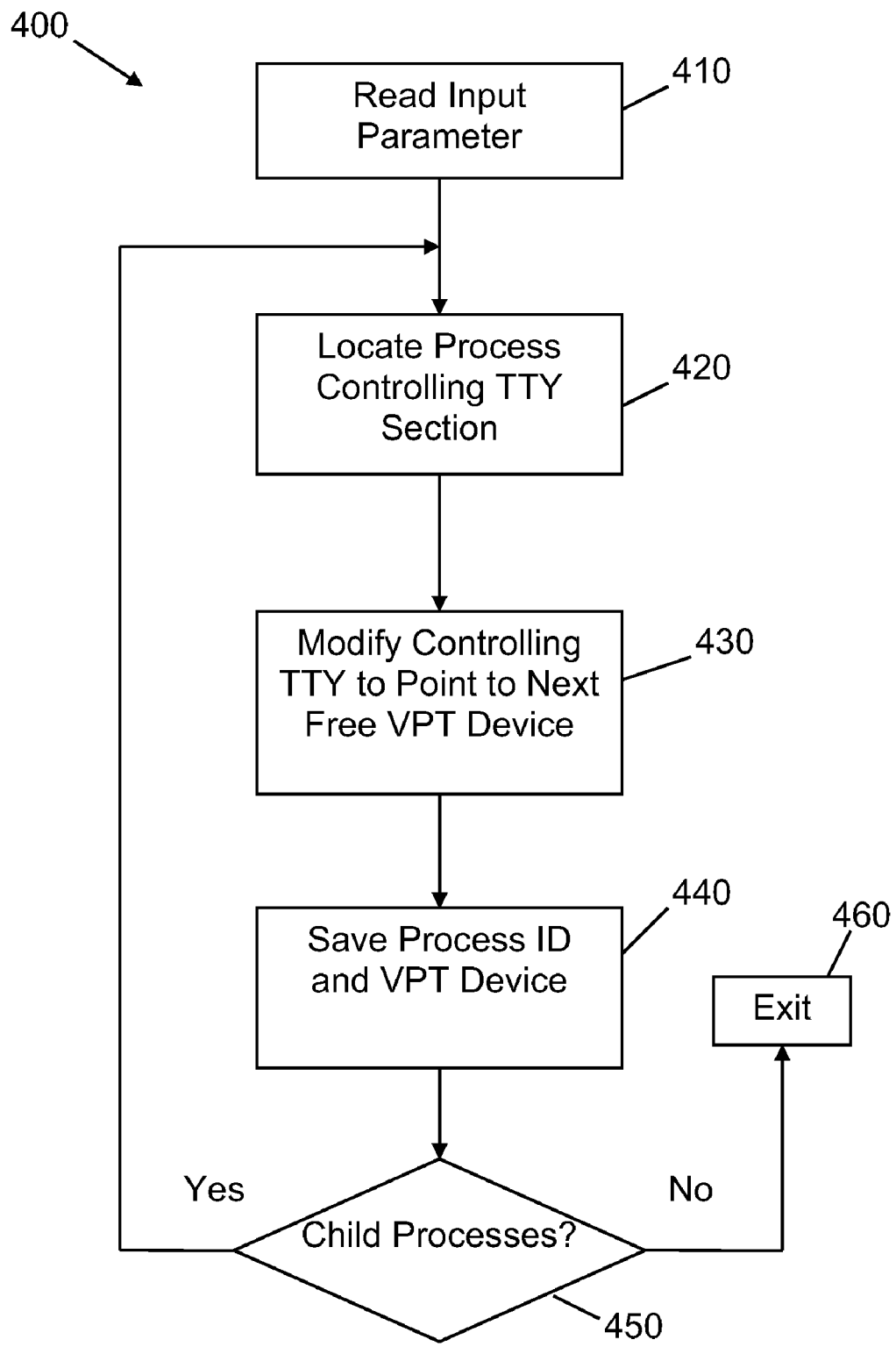
FIG. 4 illustrates a process flow of a second representative embodiment of an assign vpt module for associating a process with a virtual pseudo tty device according to the principles of the present invention.

Turning now to FIG. 2, there is illustrated an exemplary process flow diagram 200 of a create pool of virtual pseudo tty (vpt) devices module for creating a sub-directory and special character-oriented devices according to the principles disclosed by the present invention. The process flow diagram 200 is initiated, in one advantageous embodiment, when a particular system call, i.e., assign vpt that will be described in greater detail hereinafter in conjunction with FIGS. 3 and 4, is executed for the first time. It should be readily apparent to those of ordinary skill in the art that, in other advantageous embodiments, process flow 200 can also be autonomously initiated when the computer 110, described hereinabove in conjunction with FIG. 1, is first "booted-up" or, alternatively, in another advantageous embodiment, when the operating system 130 is first executed.

Following which, at a creating sub-directory module 210, a new sub-directory named, for example, virtual pseudo tty (vpt) under the directory /dev in the device file system is created. Within the UNIX environment, the sub-directory will be owned by "root" and have the following characteristics: it will belong to the group system and will access mode as rwxr-xr-x, (i.e., 755). Following the creation of the sub-directory vpt, at a construct device files module 220, a number of special character-oriented device files are created under the sub-directory /dev/vpt. The number of special character-oriented files created may be a fixed number, for example, 100, or the number of files to be created may be provided by a user prior to executing a particular application. In either event, the present invention does contemplate limiting its practice to any one particular fixed number.

The term character-oriented in identifying these newly created device files within the context of describing the present invention means that the device reads or writes one character at a time. Creating these device files can be readily accomplished, for example, under the UNIX operating system environment, by utilizing a provided utility called mknod. The special character-oriented files are named, in one advantageous embodiment, vpt1, vpt2 up to a specified number, for example, vpt100, and are created with the same unique major number, for example, 200, and have minor numbers ranging from 1 to the specified number, for instance, 100. An exemplary pseudo code listing that implements the process flow 200 for creating a sub-directory and 100 special character-oriented devices is listed below in Table 1.

TABLE 1

If create sub-directory /dev/vpt successfully
Then
  For I = 1 to 100
  Do
    Create character-oriented device file vpt{I} under /dev/vpt
  End
End The created special character-oriented device files form a pool of vpt devices and, similar with the sub-directory vpt, will be owned by root and belong to the group system. These special character-oriented device files will also have an access mode as rw-rw-rw, i.e., 666, which means that these special character-oriented device files can be read and Written to by a user, group and all others. Table 2 below illustrates how the newly created special character-oriented device files may look under the sub-directory/dev/vpt.

TABLE 2

| crw-rw-rw- | 1 | root | system | 200, 1   | Jul. 23, 2008 | vpt1   |
|------------|---|------|--------|----------|---------------|--------|
| crw-rw-rw- | 1 | root | system | 200, 2   | Jul. 23, 2008 | vpt2   |
| crw-rw-rw- | 1 | root | system | 200, 3   | Jul. 23, 2008 | vpt3   |
| ...        |   |      |        |          |               |        |
| crw-rw-rw- | 1 | root | system | 200, 100 | Jul. 23, 2008 | vpt100 |

Following the creation of the sub-directory vpt and the special character-oriented device files, the assign vpt module may be executed. In an advantageous embodiment, a program embodying the functionality of the assign vpt module is executed from a UNIX system's command line. The executed program may receive a process PID as a single input parameter or, alternatively, receive both a process PID and a virtual pseudo tty device as input parameters. Both scenarios are described hereinbelow in greater detail with references to FIGS. 3 and 4 respectively.

Turning now to FIG. 3, there is depicted a process flow 300 of one representative embodiment of an assign vpt module for associating a process with a virtual pseudo tty (vpt) device according to the principles of the present invention. In the description of this particular exemplary embodiment, only a process's identification (PID) is provided as an input parameter for association with a virtual pseudo tty device. The process flow 300 is initiated at a reading module 310 that reads in an input parameter, i.e., process PID., and subsequently determines if it is a valid process id, i.e., it is an existing process. If it is not a valid process id, the reading module 310 outputs a message indicating that the received input parameter is invalid and terminates. Conversely, if the reading module 310 verifies that it is a valid process id, process flow 300 proceeds to a first determination module 320.

Following which, at the first determination module 320, a saved vpt mapping table is queried to determine if the received process PID has already been associated with a vpt device. The vpt mapping table lists all the running processes and their corresponding assigned vpt devices. It should be readily apparent to those skilled in the art that the construction and implementation of the vpt mapping table is well known in the art. In an advantageous embodiment, the vpt mapping table is implemented with a well-known hash table. The hash table utilizes the process ids as keys and the vpt devices as values and provides the functions such as search and insert. If it is determined that the process PID is already associated with a virtual pseudo tty device, process flow 300, at an indication module 330, proceeds to output a message to indicate that the process PID is already associated with a virtual pseudo tty device. Subsequently, process flow 300 terminates at a termination module 335.

However, on the other hand, if the first determination module 320 determines that the received process PID is not associated with any virtual pseudo tty device, process flow 300 proceeds to a retrieval module 340. At the retrieval module 340, process flow 300 will retrieve the next free vpt device from the vpt device pool described previously hereinabove. A "free vpt device" is a special character-oriented device file that is not associated with any process, parent or child. Following the retrieval of the next free vpt device from the pool of vpt device pool, at a locating module 350, process flow 300 proceeds to locate the controlling tty section in the process's u-block area. Each process has an entry in the operating system kernel process table, and each process is allocated a u-block (the u in the u-block stands for user) that contains private data manipulated by the kernel. The process table contains (or points to) a per process region table, whose entries point to entries in a region table. A region is a contiguous area of a process's address space, such as text, data and stack. The region table entries describe the attributes of the region, for example, whether it contains text or data, whether it is shared or private, and where the "data" of the region is located in memory.

After locating the controlling tty section in the process's u-block, the controlling tty section is modified, at a modification module 360, to point to the next free vpt device retrieved from the vpt device pool. Next, the process PID and the associated virtual pseudo tty device are saved in the vpt mapping. table at a saving module 370.

Subsequent to process flow 300 saving the process PID and the associated virtual pseudo tty device in the vpt mapping table, a determination is made, at a second determination module 380, as to whether the process has any child processes associated with it. If the second determination module 380 determines that there are no child processes associated with the process, process flow 300 proceeds to terminate at the termination module 335. However, if the second determination module 380 determines that there are child processes associated with the process, for each identified child process, process flow 300 will repeat the actions executed in association with the location module 350, the modification module 360 and the saving module 370. That is to say that for each child process associated with the parent process, the controlling tty section of the child process is located and modified to point to the same virtual pseudo tty device that is associated with its parent process and the child process PID and the virtual pseudo tty device are saved in the vpt mapping table. An exemplary pseudo code listing that implements the process flow 300 for assigning a virtual pseudo tty device to a running process is listed below in Table 3.

TABLE 3

```
/*The input parameters contain only process id*/
Read input parameters
If the input parameter only contains the process id
Then
   If the input process id is valid
   Then
      If the process id is already in the vpt mapping table
      Then
         Print "the process is already associated with a vpt"
         Exit
      Else
         If get a free vpt device from vpt pool successfully
         Then
            Locate the controlling tty of the given process's block area
            Let controlling tty of the given process point to the free vpt
            Save the processes id and the associated vpt into the vpt
            mapping table
            For any child processes of the given process
            Do
               Locate the controlling tty of the child process's block area
               Let controlling tty of the child process point to the free vpt
               Save the child processes id and associated vpt into the vpt
               mapping table
         End
      End
   End
End
```

Turning now to FIG. 4, there is illustrated a second representative embodiment of a process flow 400 of an assign vpt module for associating a process with a virtual pseudo tty device according to the principles of the present invention. In the description of the second representative embodiment, a process's identification PID and a virtual pseudo tty device are provided as input parameters. The process flow 400 is initiated at a reading module 410 that reads in the input parameters, i.e., process PID and virtual pseudo tty device, and subsequently verifies that both the process PID and virtual pseudo tty device are valid. If either of the process id or virtual pseudo tty device are invalid, the reading module 410 outputs a message indicating that the received input parameters are invalid and terminates.

Conversely, following the verification that both of the process PID and virtual pseudo tty device are valid, process 400 proceeds, at a locating module 420, to locate the controlling tty section in the process's unblock area. After locating the controlling tty section in the process's u-block, the controlling tty section is modified, at a modification module 430, to point to the virtual pseudo tty device. Next, the process PID and the associated virtual pseudo tty device are saved in the vpt mapping table at a saving module 440.

Subsequent to process 400 saving the process PID and the associated virtual pseudo tty device in the vpt mapping table, a determination is made, at a determination module 450, as to whether the process has any child processes associated with it. If the determination module 450 determines that there are no child processes associated with the process, process flow 400 proceeds to terminate at a termination module 460. However, if the determination module 450 determines that there are child processes associated with the process, for each identified child process, process flow 400 will repeat the actions executed in association with the locating module 420, the modification module 430 and the saving module 440. For each child process associated with the parent process, the controlling tty section of each of the child process is located and modified to point to the virtual pseudo tty device associated with its parent process and the child process PID and the virtual pseudo tty device are saved in the vpt mapping table. An exemplary pseudo code listing of an assign vpt device executable program that implements the process flow 400 described above is listed below in Table 4.

TABLE 4

```
/*The input parameters contain both process id and a vpt device */
Read input parameters
If the input process id is valid and the input vpt is valid
Then
   Locate the controlling tty of the given process's block area
   Let controlling tty of the given process point to the given vpt
   Save the processes id and the associated vpt into the vpt mapping
   table
   For any child processes of the given process
   Do
      Locate the controlling tty of the child process's block area
      Let controlling tty of the child process point to the given vpt
      Save the child processes id and the associated vpt into the vpt
      mapping table
   End
End
```

The process flows and block diagrams in the FIGS. 1-4 hereinabove illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present invention has been presented for purposes of illustration and description, and is not intended to be exhaustive or limited to the invention in the form disclosed. Many modifications and variations will be apparent to those of ordinary skill in the art. The embodiments were chosen and described hereinabove in order to best explain the principles of the invention, the practical application, and to enable others of ordinary skill in the art to understand the invention for various embodiments with various modifications as are suited to the particular use contemplated.

What is claimed is:

1. A method executed in a computer system for creating and associating a virtual pseudo tty device with a running process, the method comprising:
    creating a pool of virtual pseudo tty devices, wherein the creating a pool of virtual pseudo devices includes creating a sub-directory and a plurality of virtual pseudo tty devices associated with the sub-directory; and
    assigning, in response to receiving a process identification (PID) of the running process, a virtual pseudo tty device in the pool of virtual pseudo tty devices to the running process, the assigning comprising:
        retrieving a next free virtual pseudo tty device from the pool of virtual pseudo tty devices; and
        modifying the running process's controlling tty to point to the next free virtual pseudo tty device.

2. The method as recited in claim 1, wherein the assigning further comprises verifying that the received process PID is valid.

3. The method as recited in claim 1, wherein the assigning further comprises saving the process PID and the next free virtual pseudo tty device in a virtual pseudo tty mapping table.

4. The method as recited in claim 1, wherein the assigning further comprises locating the running process's controlling tty in the running process's u-block.

5. The method as recited in claim 1, wherein the assigning further comprises determining if there are any child processes associated with the running process and, in response to a determination that there is a child process, modifying the child process's controlling tty to point to the next free virtual pseudo tty device.

6. The method as recited in claim 5, wherein the assigning further comprises adding the child process PID and the next free virtual pseudo tty device into a virtual pseudo tty mapping table.

7. The method as recited in claim 1, wherein each of the plurality of virtual pseudo tty devices is a special character-oriented device file.

8. A system, comprising a hardware implemented processor and a memory, for creating and associating a virtual pseudo tty device with a running process, the system comprises a virtual pseudo tty module, provided in association with the memory and executable by the processor, wherein the virtual pseudo tty module comprising:
    a create a pool of virtual pseudo tty devices module that creates a pool of virtual pseudo vpt devices; and
    an assign virtual pseudo tty module that, in response to receiving a process identification (PID) of a running process, assigns a next free virtual pseudo tty device in the pool of virtual pseudo tty devices to the running process, the assign virtual pseudo tty module comprising:
        a retrieval module that retrieves a next free virtual pseudo tty device from the pool of virtual pseudo tty devices; and
        a modification module that modifies the running process's controlling tty to point to the next free virtual pseudo tty device.

9. The system as recited in claim 8, wherein the create a pool of virtual pseudo tty devices module including:
    a creating sub-directory module that creates a sub-directory; and
    a construct device files module that creates a plurality of special character-oriented device files associated with the sub-directory, wherein the plurality of special character-oriented device files correspond to the pool of virtual pseudo tty devices.

10. The system as recited in claim 8, wherein the assign virtual pseudo tty module further comprises a saving module that saves the process id and the next free virtual pseudo tty device in a virtual pseudo tty mapping table.

11. The system as recited in claim 8, wherein the assign virtual pseudo tty module further comprises a reading module that verifies that the received process PID is valid.

12. The system as recited in claim 8, wherein the assign virtual pseudo tty module further comprises a locating module that locates the running process's controlling tty in the running process's u-block.

13. The system as recited in claim 8, wherein the assign virtual pseudo tty module further comprises a determination module that determines if there are any child processes associated with the running process and, in response to a determination that there is a child process, modifying the child process's controlling tty to point to the next free virtual pseudo tty device.

14. The system as recited in claim 13, wherein the assign virtual pseudo tty module further comprises a saving module that adds the child process PID and the next free virtual pseudo tty device into a virtual pseudo tty mapping table.

15. A non-transitory computer-readable storage medium having encoding thereon computer-executable instructions for creating and associating a virtual pseudo tty device with a running process, the computer-executable instructions performing a method comprising:
    creating a pool of virtual pseudo tty devices, the creating a pool of virtual pseudo tty devices includes creating a sub-directory and a plurality of special character-oriented device files associated with the sub-directory, wherein the plurality of special character-oriented device files correspond to the pool of virtual pseudo tty devices; and
    assigning, in response to receiving a process identification (PID) of the running process, a virtual pseudo tty device in the pool of virtual pseudo tty devices to the running process, the assigning comprising:
        retrieving a next free virtual pseudo tty device from the pool of virtual pseudo tty devices; and
        modifying the running process's controlling tty to point to the next free virtual pseudo tty device.

16. The computer-readable storage medium as recited in claim 15, wherein the assigning further comprises verifying that the received process PID is valid.

17. The computer-readable storage medium as recited in claim 15, wherein the assigning further comprises saving the process PID and the next free virtual pseudo tty device in a virtual pseudo tty mapping table.

18. The computer-readable storage medium as recited in claim 15, wherein the assigning further comprises locating the running process's controlling tty in the running process's u-block.

19. The computer-readable storage medium as recited in claim 15, wherein the assigning further comprises determining if there are any child processes associated with the running process and, in response to a determination that there is a child process, modifying the child process's controlling tty to point to the next free virtual pseudo tty device.

20. The computer-readable storage medium as recited in claim 19, wherein the assigning further comprises adding the child process PID and the next free virtual pseudo tty device into a virtual pseudo tty mapping table.

* * * * *